US008966366B2

(12) United States Patent
Tom

(10) Patent No.: US 8,966,366 B2
(45) Date of Patent: Feb. 24, 2015

(54) METHOD AND SYSTEM FOR CUSTOMIZING INFORMATION PROJECTED FROM A PORTABLE DEVICE TO AN INTERFACE DEVICE

(75) Inventor: Alfred C. Tom, San Francisco, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 643 days.

(21) Appl. No.: 13/235,913

(22) Filed: Sep. 19, 2011

(65) Prior Publication Data
US 2013/0073958 A1    Mar. 21, 2013

(51) Int. Cl.
*H04N 21/47* (2011.01)
*G06F 9/44* (2006.01)
*G06F 9/445* (2006.01)

(52) U.S. Cl.
CPC .............. *G06F 8/38* (2013.01); *G06F 9/44505* (2013.01)
USPC ........... 715/716; 715/744; 715/835; 348/837; 348/836

(58) Field of Classification Search
CPC ..................................................... H04N 21/47
USPC ......................................................... 715/716
See application file for complete search history.

(56) References Cited

U.S. PATENT DOCUMENTS

| 8,447,598 | B2 * | 5/2013 | Chutorash et al. ............ 704/231 |
| 8,548,532 | B1 * | 10/2013 | Ng .............................. 455/569.1 |
| 8,634,033 | B2 * | 1/2014 | Vanderwall et al. .......... 348/837 |
| 2004/0056890 | A1 * | 3/2004 | Hao et al. ...................... 345/744 |
| 2008/0156173 | A1 * | 7/2008 | Bauer ............................. 84/601 |
| 2008/0215240 | A1 * | 9/2008 | Howard et al. ................ 701/213 |
| 2008/0303794 | A1 | 12/2008 | Bolt et al. |
| 2009/0164473 | A1 * | 6/2009 | Bauer ............................. 707/10 |
| 2010/0037057 | A1 * | 2/2010 | Shim et al. ..................... 713/171 |
| 2010/0095233 | A1 | 4/2010 | Skourup et al. |
| 2010/0220250 | A1 * | 9/2010 | Vanderwall et al. .......... 348/837 |
| 2011/0247013 | A1 * | 10/2011 | Feller et al. .................... 719/320 |
| 2011/0257973 | A1 * | 10/2011 | Chutorash et al. ............ 704/235 |
| 2012/0110511 | A1 * | 5/2012 | Howard ......................... 715/835 |

FOREIGN PATENT DOCUMENTS

| CN | 101582010 A | 11/2009 |
| CN | 101802766 A | 8/2010 |
| CN | 102138125 A | 7/2011 |

OTHER PUBLICATIONS

CE4A, "Position Paper EG Terminal Mode", published on Sep. 1, 2008, available at CE4A website <http://ce4a.org>, 14 pages.*
Raja Bose et al. "Terminal Mode—Transforming Mobile Devices into Automotive Application Platforms", Published on Sep. 12, 2010, 8 pages.*

(Continued)

*Primary Examiner* — Reza Nabi
(74) *Attorney, Agent, or Firm* — Quinn Law Group, PLLC

(57) ABSTRACT

A method and system modifies a user interface (UI) of a portable device in communication with an interface device, where the UI is projected by a human-machine interface of the interface device to a user. The UI is modified by the portable device prior to being output to the interface device based on customized style information provided by the interface device. The interface device may be a vehicle interface device such as a head unit or infotainment system, and the portable device may be a smart phone, media player, or other computing device capable of displaying graphical information.

18 Claims, 2 Drawing Sheets

(56) References Cited

OTHER PUBLICATIONS

Brakenseik, Nokia Research Center, "Integration of Mobile Apps into the Vehicle HMI: Terminal Mode", published on Apr. 13, 2010, available at <http://www.mvnodynamics.com/wp-content/uploads/2011/01/terminal_mode-1.pdf>, 17 pages.*

Raja Bose et al. "Terminal Mode—Transforming Mobile Devices into Automotive Application Platforms", Published on Nov. 12, 2010.*

Brakenseik, Nokia Research Center, "Integration of Mobile Apps into the Vehicle HMI: Terminal Mode", published on Apr. 3, 2010, available at <http://www.mynodynamics.com/wp-content/uploads/2011/01/terminal_mode-1.pdf>.*

CE4A, "Position Paper EG Terminal Mode", published on Sep. 1, 2008, available at CE4A website <http://ce4a.org>.* http:www.nokia.com/terminalmode.

* cited by examiner

METHOD AND SYSTEM FOR CUSTOMIZING INFORMATION PROJECTED FROM A PORTABLE DEVICE TO AN INTERFACE DEVICE

TECHNICAL FIELD

The present invention relates generally to external device integration within a vehicle.

BACKGROUND

An increasing number of vehicles are being configured such that portable consumer electronic devices, for example, smart phones, may interface with the human machine interface (HMI) offered by the vehicle. The portable device, for example, a vehicle user's phone, may interface with the vehicle by projecting through a vehicle user interface, such as a navigation screen, where the output displayed on the vehicle user interface by the phone is that of the phone and not of the vehicle. Because the phone hardware and software can be readily updated, this provides the advantage that the hardware and software used to provide information to the vehicle user interface can be conveniently maintained and readily updated. However, because the user's phone controls the display, including the look-and-feel of the user interface as projected through the vehicle HMI, the graphical elements of the display are dictated by the user's phone, and are not controlled by the vehicle or vehicle manufacturer.

As part of their branding strategy, most vehicle manufacturers adopt a vehicle brand-specific look-and-feel for many styling elements of the vehicle design, which may include a vehicle brand-specific look-and-feel for the vehicle HMI elements, including the vehicle display. The vehicle brand specific look-and-feel may include vehicle specific styling of fonts, colors, etc., of the vehicle display. When the user's phone controls the look-and-feel of the vehicle HMI elements to project graphical information through the vehicle display, the vehicle brand-specific style guidelines are overridden, which is inconsistent with the vehicle manufacturer's branding strategy.

SUMMARY

A method and system provided herein includes an interface device configured to send customized style information to a portable device in communication with the interface device. The portable device customizes the user interface of the portable device using the customized style information from the interface device to provide a customized interface to be presented by the interface device. The portable device may be configured as a smart phone, netbook, e-reader, personal digital assistant (PDA), gaming device, video player, or other computing device capable of defining a user interface which may include graphical information, a video or another type of image that may be projected on a screen.

The interface device may include a human-machine interface (HMI) for presenting the customized interface of the portable device. In a non-limiting example, the interface device may be a vehicle interface device defined at least in part by a head unit, a navigation system or an infotainment system of the vehicle. By way of example, an advantage of the method and system described herein is the capability for a vehicle manufacturer to control the style, e.g., the look-and-feel, of the information presented to a vehicle user by the vehicle interface device from a portable user device, and thereby maintain a vehicle look-and-feel consistent with the vehicle's branding guidelines for customized information provided by the vehicle interface device to the vehicle user for the information presented.

A method of customizing the user interface of the portable device which is presented by an interface device in communication with the portable device includes linking the portable device and the interface system, where the portable device includes an operating system defining a user interface, and the interface device includes an HMI. The method further includes providing customized style information defined by the interface device to the portable device and generating a customized interface, wherein the portable device generates the customized interface using the customized style information. The customized interface may be outputted from the portable device to the interface device and presented to the user by the interface device using the HMI.

The method may further include using the interface device to run an application from the portable device, where the application is resident on the portable device and the application defines an application user interface. The portable device may create a customized application interface using the customized style information, and may output the customized application interface from the portable device to the interface device. The interface device may receive the customized application interface from the portable device and present the customized application interface using the HMI. The customized style information may include one or more of a style rule, a style selector, and a style sheet and may define one or more of a font size, a font color, a font style, text alignment, a color, a shape, a background style, a border, a margin, spacing, alignment, and size which is defined by the interface device.

A system for projecting a user interface using an interface device in communication with a portable device is described herein. In a non-limiting example, the interface device may be a vehicle interface device included in a portable device-to-vehicle interface device communication system of a vehicle. The system may include a portable device defining a user interface and configured to modify the user interface using customized style information. The system may include an interface device configured to provide the customized style information, the interface device including a human-machine interface (HMI). The HMI is configurable to present the user interface of the portable device when the portable device and the interface device are linked by a communication link configured to selectively link the portable device and the interface system. In a non-limiting example, when the portable device and the interface device are linked, the interface device may provide customized style information to the portable device, and the portable device may modify the user interface using the customized style information to generate a customized interface which is presented by the interface device using the HMI.

The above features and other features and advantages of the present invention are readily apparent from the following detailed description of the best modes for carrying out the invention when taken in connection with the accompanying drawings.

DETAILED DESCRIPTION

Figure 1:
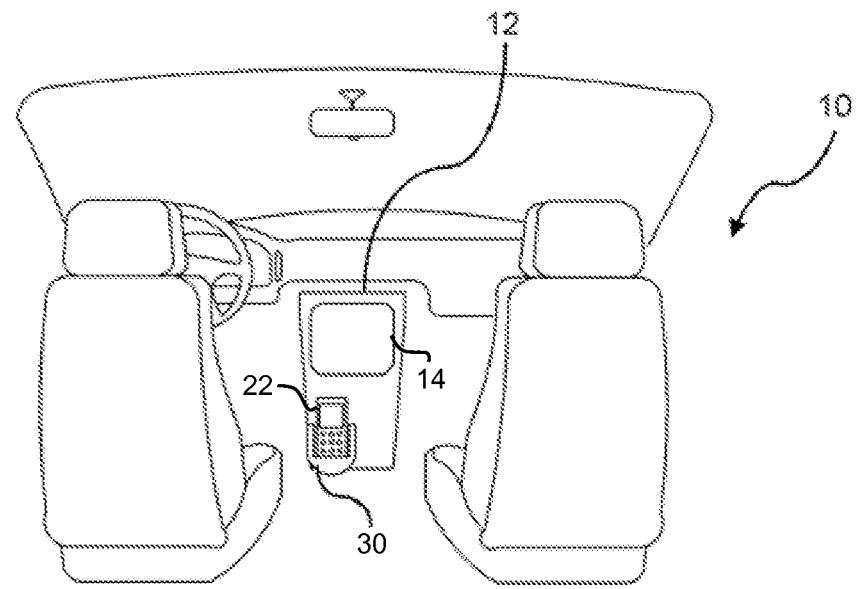
FIG. 1 is a perspective schematic view of a portable device-to-vehicle interface system.

Referring to the drawings wherein like reference numbers represent like components throughout the several figures, there is shown in FIG. 1 a perspective view of a portable device-to-vehicle interface system 10 including a vehicle interface device 12 configured to be in selective communication with a portable device 22 via a communication link 30. The vehicle-based interface device 12 includes at least one human machine interface (HMI) device 14 configured to project the user interface of the portable device 22 through the vehicle interface device 12 to the vehicle user. In a non-limiting example, the portable device-to-interface system 10 is shown as a vehicle interface system, however it would be understood that the interface system 10 may be configured as a non-vehicle interface system.

The portable device 22 may be carried by a user of the interface system 10, e.g., a user of the vehicle. An example of a portable device 22 includes, but is not limited to, a smart phone, a netbook, an e-reader, a personal digital assistant (PDA), a portable media player, a gaming device, and any other device capable of running a plurality of software applications 28, either pre-loaded or downloaded by the user, which may be stored on and executed by the portable device 22 to provide a video, e.g., a graphical output such as but not limited to a graphical user interface. Examples of the plurality of software applications 28 may include, but is not limited to, music, DVD, phone, navigation, weather, email and a web browser. In some devices 22 software applications may be added, updated or deleted from the portable device 22 at the user's discretion. Other devices 22 may be special purpose and have a set functionality that cannot be changed by the user.

Figure 2:
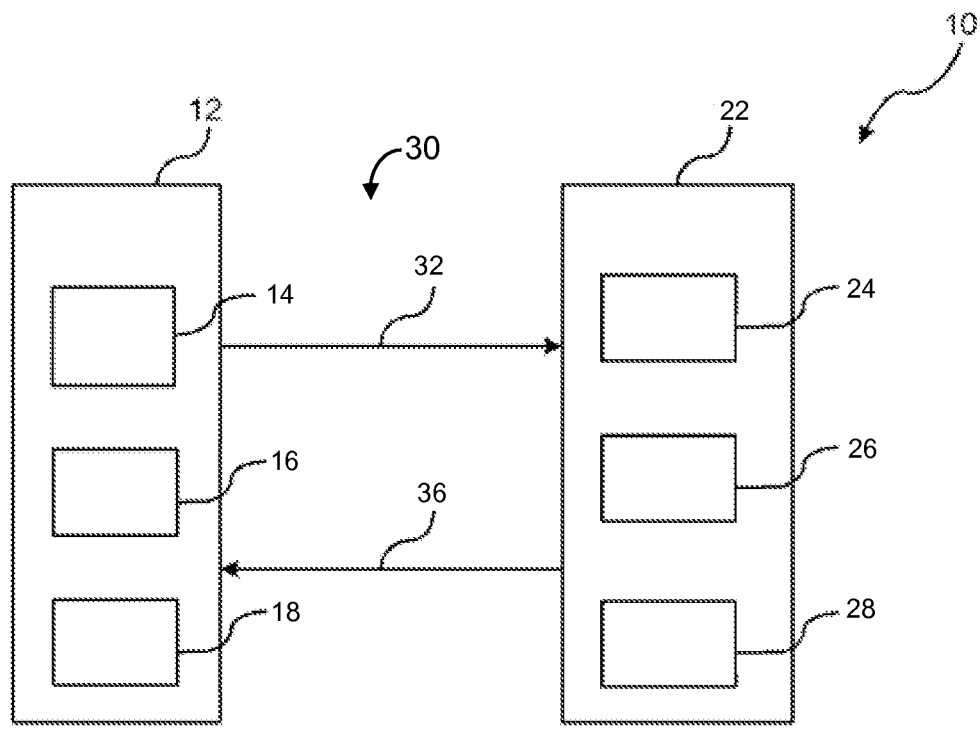
FIG. 2 is a block diagram of the portable device-to-vehicle interface system.

As shown in FIG. 2, the portable device 22 may include an operating system 24, which may provide functionality such as authenticating the portable device 22 to the interface device 12 through a handshaking process or other authenticating process, presenting a menu or listing of available applications 26 to a user, and enabling a selected application 28. The operating system 24 may be configured to format a user interface using style information which is provided to the portable device 22.

The portable device 22 further includes a communications interface 26 which may be used to enable interaction between the portable device 22 and the vehicle interface device 12. The communications interface 26 may be designed to allow an HMI 14 of the vehicle interface device 12 to accept video data from the portable device 22, such that a user interface or other graphical or video output of the portable device 22 may be displayed on or otherwise provided to the HMI 14 of the vehicle interface device 12. The communications interface 26 may utilize one or more application programming interfaces (APIs), instructions, libraries and operating systems to execute the protocols used to communicate between the portable device 22 and the vehicle interface system 12. The communications interface 26 may be used when the vehicle interface device 12 and portable device 22 communicate to configure the HMI 14, exchange content, and exchange control information. It should be understood that the communications interface 26 may include a complete interface, a single function interface, or a plurality of interfaces. The communications interface 26 may execute the communication protocol, and may receive style information 32 from the vehicle interface device 12 to control the style, e.g., the formatting or look-and-feel of a video, image and/or user interface provided by the portable device 22 to the HMI 14.

FIG. 2 shows the portable device 22 linked to the vehicle interface device 12 of the vehicle interface system 10 via a communication link 30 (see FIG. 1) to enable transfer of data between the devices 12, 22. The transfer of data may include transmitting customized style information 32 from the vehicle interface 12 to the portable device 22, and outputting video, graphic image and/or user interface information 36 from the portable device 22 to the vehicle interface device 12. The communication link 30 may be a wireless communication medium, for example, Bluetooth, Wi-Fi, etc., or may be a wired communication medium, for example, a universal serial bus (USB) or other hardwire cable. A protocol such as Virtual Network Computing (VNC) may be used over the communication link 30 to project graphics from the portable device 22 to the HMI 14. The portable device 22 may also utilize a direct hardware video out signal to project the contents of the screen of the portable device 22 onto a screen included in the vehicle interface device 12, e.g., a vehicle screen included in the HMI 14. Video signals such as High-Definition Multimedia Interface (HDMI) and composite video may be used and may be output to the vehicle interface device 12 using a hardwire video cable.

The portable device 22 may be configured to generate and display a user interface, which may be a graphical user interface and/or a video, including an image (static or otherwise) that may be projected on a screen. A portable device 22 may utilize a touch screen wherein the user interface is projected on the screen and selections are made by either touching an application/icon on the screen or utilizing a cursor to navigate to the application/icon. A user interface of the portable device 22 is outputted to the vehicle interface device 12, and the HMI 14 presents, via a vehicle screen, the outputted video or graphical information of the user interface. This allows a user of the vehicle to access the user interface of the phone, which may be a home screen, menu screen, application screen, etc. via the controls of the vehicle interface 12 and HMI 14, as opposed to handling and viewing the portable device 22 directly. Additionally, a user of the vehicle may select, launch and use one or more of the applications 28 on the portable device 22 via the controls of the vehicle interface 12 and the HMI 14, and view the video output, e.g., the graphical user interface, of a selected application 28 on a vehicle screen as presented by the HMI 14. The vehicle screen may be a touch screen, such that a vehicle user may utilize the vehicle touch screen to make selections and generally operate the application by either touching an application/icon on the screen or utilizing a cursor to navigate to the application/icon projected from the HMI 14.

Preferably, the HMI 14 has dual functionality that includes accepting a user's manual input and/or presenting application content to the user. An example of an HMI 14 that includes dual functionality is a navigation device. The navigation device has dedicated buttons or a touch screen for accepting the user's selection. The navigation device further includes a display screen that can be used to display application content. Another example of an HMI 14 having dual functionality is a radio system. Radio control buttons/knobs can be used by the user for making input selections and the radio display may be used for presenting the graphical application content to the user. In a non-limiting example, the HMI 14 may include at least one of a head unit and a video projection screen.

Alternatively, two separate devices may be used for input selection and output selection, respectively. For example, a respective HMI device 14 may be used for receiving a user input selection, such as a switch disposed on the steering wheel. A second respective HMI device 14 used to present application content to the user may include a message display screen such as those used to display vehicle speed, fuel economy, odometer readings, etc. Moreover, text-to-speech functionality may also be provided by the vehicle interface device 12 to output audio to the user in the vehicle. In addition, the vehicle could also provide a speech recognition system for entering text into an application 28 on the portable device 22 through the HMI 14. The speech recognition system would be an alternative for a control input switch, touch screen, keyboard or similar.

The vehicle interface device 12 may include an operating system 16 which may provide functionality such as authenticating the portable device 22 to the interface device 12 through a handshaking process or other authenticating process, and transmitting customized style information 32 to the portable device 22. The vehicle interface device 12 may include a memory 18 which is configured of sufficient size and type to store the customized style information 32. It would be understood that the operating system 16 and/or the memory 18 may be configured elsewhere within the vehicle interface system 10 and in operable communication with the vehicle interface device 12.

The portable device 22 may store the customized style information 32 sent by the vehicle interface device 12. The portable device 22 may have a graphics system that the portable device 22 uses to project a user interface to a screen. The graphics system may be configured to read the customized style information 32 and to change the look of the user interface based on the content of the customized style information 32. In one non-limiting example, the portable device 22 may have an operating system 24 that includes a graphics system. The operating system 24 may have built-in graphical elements that are used by the operating system 24 to build a user interface. These graphical elements may be able to change their look based on the customized style information 32. These graphical elements may also be used by one or more applications 28 resident on the portable device 22 to build the application's user interface. Thus, when the operating system 24 changes the look of the graphical elements based on the customized style sheet 32 the user interface of the application 28 also changes its look. One or more of the applications 28 may also define its own custom graphical elements. These custom graphical elements may also be designed to change their look based on customized style information 32. Thus, when the operating system 24 communicates new customized style information to the applications 28, the applications 28 will be able to change the look of the customized graphics elements as well.

The vehicle interface device 12 may use the customized style information 32 to format information generated by the vehicle interface system 10 and displayed using the HMI 14. Information which is generated by the vehicle including the vehicle interface system 10 may include vehicle speed, fuel economy, odometer readings, etc., derived from sensors or systems incorporated in the vehicle. Other examples may include information from accessories permanently incorporated into the vehicle, such as the vehicle radio or navigation system, where the information displayed may include the radio channel selection, sound settings, navigation settings, maps, etc., understanding these images are generated, formatted and displayed by the vehicle interface system 10. The vehicle interface device 12 may use the customized style information 32 to format the graphical information displayed, where the customized style information 32 is defined according to, and/or in compliance with the vehicle manufacturer's branding guidelines for that vehicle. By way of example, the vehicle branding guidelines may specify a specific font type and color to be used for the display of information, may specify a brand related color scheme or pattern for background areas and/or borders, and/or may incorporate elements of a vehicle manufacturer's logo or the vehicle's nameplate, etc. By formatting the displayed information in a manner consistent with the vehicle manufacturer's branding guidelines for the vehicle and/or the vehicle manufacturer, the vehicle manufacturer can provide a consistent look-and-feel to the vehicle HMI elements, which provides a consistent brand experience to the vehicle user.

As described herein, the vehicle interface system 10 may be configured to customize the look-and-feel of the graphical information coming from, e.g., outputted by, the portable device 22 and presented to the user by the HMI 14. By having the portable device 22 modify (according to the customized style information 32) the graphical user interface projected to the HMI 14, the vehicle manufacturer can continue to provide a consistent, vehicle branded, look-and-feel for information displayed through the HMI 14, even for information displayed from a portable device 22. Because the vehicle brand specific (customized) style information 32 is provided by the vehicle interface device 12 to the portable device 22 when the portable device 22 and the vehicle interface device 12 are in communication, the portable device 22 is able to customize its user interface for the style of vehicle with which it is linked. When the portable device 22 is removed by the user and linked to another vehicle of another make or manufacturer, the portable device 22 may receive another set of customized style information 32 specific to the other vehicle, to customize its output according to that other vehicle's branding guidelines as defined by that vehicle's customized style information 32.

Figure 3:
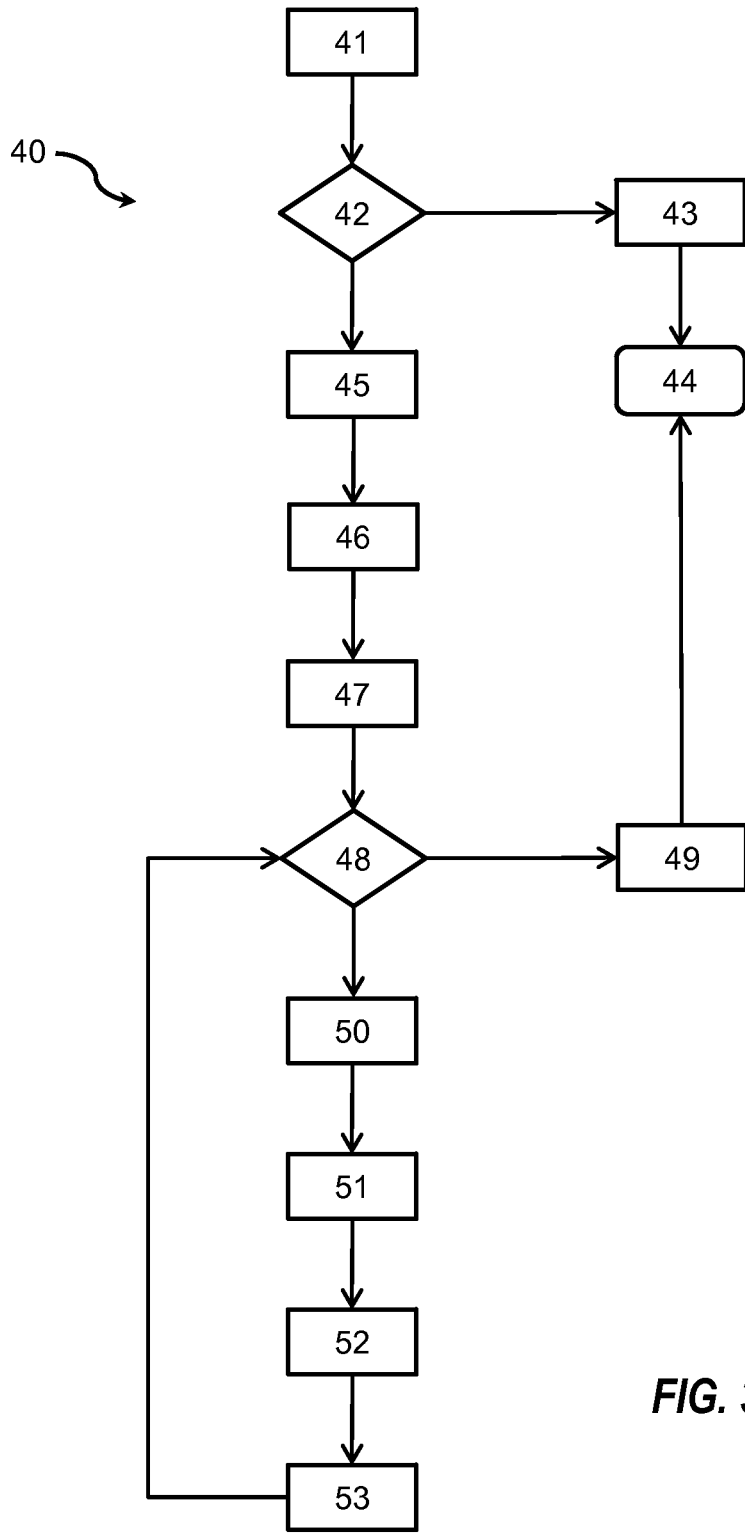
FIG. 3 is a flowchart of a method for using a vehicle specified style sheet to modify the look-and-feel of graphical information projected by a user device to a vehicle interface.

FIG. 3 shows, in non-limiting example, a method 40 which may be used to customize the video output, e.g., the user interface of a portable device 22 projects to an HMI 14 when the portable device 22 is in communication with the vehicle interface device 12. Beginning with step 41, a portable device, such as the portable device 22 shown in FIGS. 1 and 2, and an interface device, such as the vehicle interface device 12 shown in FIGS. 1 and 2, initiate a connection process to establish a communications link 30. The portable device 22 may be a smart phone, netbook, e-reader, personal digital assistant (PDA), gaming device, or media player, e.g., an audio and/or video player, or other computing device capable of projecting video and/or graphical images, where graphical images may include text or textual images. In a non-limiting example, the connection process at step 41 may be initiated by placing the portable device 22 in wired contact with the interface device 12 using, for example, USB connectors. In another non-limiting example, the connection process at step 41 may be initiated by placing the portable device 22 in sufficient proximity to the vehicle interface device 12 such that the devices may establish a wireless communications link using Wi-Fi, Bluetooth or other similar means. The devices 12, 22 may initiate a handshake or other authentication process, which may be a secured authentication process, to selectively establish the communication link 30 between the devices 12, 22. At step 42, if the connection process is unsuccessful, the method proceeds to step 43, and the connection process and/or communication link 30 is terminated by the interface device 12. At step 44, the vehicle user is notified by the interface device 12, for example, through the HMI 14, that the connection process was unsuccessful and/or that the communications link has been terminated.

At step 42, if the connection process is successful, the communications link 30 is established between the interface device 12 and the portable device 22, and the method proceeds to step 45. At step 45, the vehicle interface device 12 provides or transmits customized style information 32 to the portable device 22, and the customized style information 32 is received and stored by the portable device 22. At step 46 the operating system 24 of the portable device 22 may use the customized style information 32 to modify the user interface projected to the HMI 14. In one non-limiting example, the built-in graphical elements of the operating system 24 may have the ability to take on different looks based on the customized style information 32. The operating system 24 may also have a default look when there is no customized style information 32 from a connected vehicle interface device 12. The resulting user interface of the portable device 22 is projected to the HMI 14 via a video output 24. The video output 34 may be, for example, a user interface of the portable device operating system 24, a graphical user interface of an application 28, or other form of graphical output from the portable device 22 which has been formatted by the portable device 22 using the customized style information 32 provided by the interface device 12 to the portable device 22 at step 45.

The customized style information 32 is specific to the vehicle interface device 12 and/or the vehicle interface system 10, and may, in the non-limiting example shown in FIG. 1, include style information which is defined by the vehicle manufacturer and/or defined by branding or styling guidelines according to one or more of the vehicle manufacturer, the vehicle brand, the vehicle make and the vehicle model. The customized style information 32 may include at least one of a font size, a font color, a font style, text alignment, a color, a shape, a background style, a border, a margin, spacing, alignment, and size which is defined by the interface device 12 and/or vehicle interface system 10, and which, in a non-limiting example, may be identifiable to one or more of the vehicle brand, the vehicle make and the vehicle model. The customized style information may include at least one of a style rule, a style selector, and a style sheet. The style sheet, in a non-limiting example, may be configured as a subset or modification of a cascading style sheet (CSS), or may be otherwise configured to define those characteristics of the graphical elements of the operating system 24 of the portable device 22 which may be customized. In a non-limiting example, a standardized style sheet may be developed to be used by a plurality of smart phone operating systems, defining those characteristics of a phone projector user interface using one of the plurality of smart phone operating systems, which may be customized, such that the standardized style sheet including customized style information 32 for a vehicle interface device 12 may be provided by the vehicle interface device 12 to any smart phone 22 in communication with the vehicle interface device 12, wherein the smart phone 22 is configured with one of the plurality of smart phone operating systems for use by the smart phone 22 in customizing its user interface for display by the vehicle interface device 12.

At step 47, the portable device 22 outputs the customized interface 34 to the vehicle interface device 12 to be displayed by the HMI 14, such that the user interface of the portable device 22, now formatted using the customized style information 32, is displayed by the HMI 14. In a non-limiting example, the HMI 14 may include at least one of a head unit and a video projection screen.

At step 48, the user may elect to terminate or maintain the communications link 30. The user may elect to terminate the communications link 30, for example, when the portable device 22 is removed from the vehicle by the user, or when the user elects to use the portable device 22 directly, for example, when the user is a passenger in the vehicle. When the user elects, at step 48, to terminate the communications link 30, the communications link 30 may be discontinued at step 49 by removing the portable device 22 from the vehicle interface device 22 to terminate a wired connection, or by discontinuing a wireless connection, and at step 44, the vehicle user may be notified via the vehicle interface device 12 and/or the HMI 14 that the communication link 30 has been terminated. At this point the portable device 22 may revert back to a default user interface and stop using the customized style information 32.

At step 48, the user may elect to maintain the communications link 30 providing continued access to the user interface of the portable device 22 through the HMI 14. At step 50, the vehicle user may request an application 28, which may be one of a plurality of applications 28, to be launched by the portable device 22, by selecting the application 28 from the customized interface of the portable device 22 projected on the HMI 14. The HMI 14 may include a touch screen through which the vehicle user may select the application 28, or the HMI 14 may provide other inputs by which application 28 may be selected, including but not limited to switches on the steering wheel, inputs for navigation unit or radio including hard buttons, knobs or switches, message center display switches, and speech recognition.

At step 51, the application 28 creates its application user interface, and the application user interface is modified and/or formatted using the customized style information 32 to generate a customized application user interface, also referred to herein as a customized application interface. The application user interface may be, for example, a graphical user interface, a video, or other interface including graphical images. In a non-limiting example, the application user interface may be modified by the operating system 24 of the portable device 22 using the customized style information 32 to generate the customized application interface. In another non-limiting example, the application 28 may use the customized style information 32 to generate the customized application interface which is projected to the vehicle interface device 12. In yet another non-limiting example, the built-in graphical elements used by applications 28 resident on the portable device 22 to build the application's user interface may also have the ability to take on different looks based on the customized style information 32. These application graphical elements may also have a default look when there is no customized style information 32 from a connected vehicle interface device 12. At step 52, the customized application interface is outputted by the portable device 22 to the vehicle interface 12, and at step 53 the customized application interface is projected by the HMI 14 for display to and access by the vehicle user.

After completing use of the application 28, the method continues as shown in FIG. 3 at step 48, where the vehicle user may elect to terminate or maintain the communications link 30, where maintaining the communications link 30 may include selecting another of the applications 28 to be launched by the portable device 22. In this event, the process would continue as described previously, including selecting the application 28 at step 50, modifying the application user interface using the customized style information 32 and the operating system 24 and/or application 28 to generate a customized application interface at step 51, outputting the customized application interface at step 52 to the vehicle interface device 12 from the portable device 22, and projecting the customized application interface using the HMI 14 at step 53.

Other configurations of the system and method described herein are possible. The system and method described herein may be implemented for a non-vehicle interface system projecting output from a portable device. For example, the non-limiting interface system may be a branded interface including a display provided for user convenience, such human machine interface provided to an airline passenger for use with the passenger's portable device, where the style selectors may be specified by the airline consistent with airline branding guidelines. In another non-limiting example, the interface system may be a transaction interface system for a financial transaction, such as a retail purchase or banking transaction, where the portable device may be in communication with the transaction interface system to enable use of a payment or financial transaction application resident on the portable device, and wherein the style selectors used to project the graphical user interface of the application on the transaction interface may be specified by the retailer or bank consistent with the retailer or bank's branding strategy.

While the best modes for carrying out the invention have been described in detail, those familiar with the art to which this invention relates will recognize various alternative designs and embodiments for practicing the invention within the scope of the appended claims.

The invention claimed is:

1. A method comprising:
linking a portable device and an interface device;
wherein the portable device includes an operating system defining a user interface of the portable device;
wherein the interface device includes a human-machine interface (HMI);
wherein the interface device includes customized style information defined by a branding guideline applicable to the interface device;
providing the customized style information from the interface device to the portable device;
generating a customized interface via the portable device using the customized style information;
outputting the customized interface from the portable device to the interface device;
presenting the customized interface on the interface device using the HMI;
requesting an application using the interface device, wherein the application is provided by the portable device and defines an application user interface which includes one or more graphical elements corresponding to the application;
generating a customized application interface using the customized style information and the portable device;
outputting the customized application interface from the portable device to the interface device; and
presenting the customized application interface including the one or more graphical elements to the interface device using the HMI, wherein the style information includes two or more of a style rule, a style selector, and a style sheet.

2. The method of claim 1, wherein generating the customized application interface further includes one of:
using the portable device operating system and the customized style information to generate the customized application interface; and
using the application and the customized style information to generate the customized application interface.

3. The method of claim 1, wherein the customized style information includes at least one of a font size, a font color, a font style, text alignment, a color, a shape, a background style, a border, a margin, spacing, alignment, and size which is defined by the interface device.

4. The method of claim 1, wherein:
the HMI includes a display;
the user interface is a graphical user interface; and
generating the customized interface by customizing the graphical user interface of the portable device using the customized style information includes formatting the graphic elements of the user interface using the customized style information, wherein the formatting is performed by the portable device.

5. The method of claim 1, wherein the user interface is configured as a video provided by the portable device, the method further including;
modifying the video, wherein the portable device modifies the video using the customized style information to generate a customized video;
outputting the customized video from the portable device to the interface device; and
presenting the customized video using the HMI.

6. The method of claim 1, wherein the interface device is configured as a vehicle interface device.

7. The method of claim 6, wherein the interface device includes at least one of a head unit and a video projection screen.

8. The method of claim 1, wherein the portable device is one of a smart phone, netbook, e-reader, personal digital assistant (PDA), gaming device, and media player.

9. The method of claim 1, wherein the style information is defined by a modified cascading style sheet.

10. A system comprising:
a portable device defining a user interface, the portable device being configured to modify the user interface;
an interface device configured to provide customized style information, the interface device including a human-machine interface (HMI) configured to project the user interface of the portable device when the portable device and the interface device are linked;
wherein the customized style information is defined by a branding guideline applicable to the interface device;
wherein the style information includes two or more of a style rule, a style selector, and a style sheet;
a communication link configured to selectively link the portable device and the interface device;
wherein when the portable device and the interface device are linked, the interface device provides the customized style information to the portable device, and the portable device modifies the user interface using the customized style information to generate a customized interface, wherein the customized interface is projected to the HMI via the interface device; and
wherein the portable device includes an application defining an application user interface which includes one or more graphical elements corresponding to the application and is configured to use the application user interface and the customized style information to generate a customized application interface and output the customized application interface including the one or more graphical elements from the portable device to the interface device using the HMI.

11. The system of claim 10, wherein the portable device further includes
an operating system defining the user interface and configured to use the customized style information and the user interface to generate the customized interface.

12. The system of claim 10, wherein the customized style information includes at least one of a font size, a font color, a font style, text alignment, a color, a shape, a background style, a border, a margin, spacing, alignment, and size which is defined by the interface device.

13. The system of claim 10, wherein the interface device is configured as a vehicle interface device.

14. The system of claim 13, wherein the interface device includes at least one of a head unit and a video projection screen.

15. The system of claim 10, wherein the portable device is one of a smart phone, netbook, e-reader, personal digital assistant (PDA), gaming device, and media player.

16. The system of claim 10, wherein the style information is configured to include a modified cascading style sheet.

17. A vehicle comprising:
  a portable device defining a user interface and configured to modify the user interface using style information;
  a vehicle interface device configured to provide customized style information, the vehicle interface device including a human-machine interface (HMI) configurable to present the user interface of the portable device when the portable device and the interface device are linked;
  wherein the customized style information is defined by a branding guideline applicable to the interface device and includes at least one of a font size, a font color, a font style, text alignment, a color, a shape, a background style, a border, a margin, spacing, alignment, and size;
  wherein the style information includes two or more of a style rule, a style selector, and a style sheet;
  a communication link configured to selectively link the portable device and the interface device;
  wherein when the portable device and the interface device are linked, the interface device provides customized style information to the portable device, and the portable device modifies the user interface using the customized style information to generate a customized interface which is presented to the HMI via the interface device; and
  wherein the portable device includes an application defining an application user interface which includes one or more graphical elements corresponding to the application and is configured to use the application user interface and the customized style information to generate a customized application interface and output the customized application interface including the one or more graphical elements from the portable device to the interface device using the HMI.

18. The system of claim 17, wherein the portable device further includes:
  an operating system defining the user interface and configured to use the customized style information and the user interface to generate the customized interface.

* * * * *